United States Patent
Manbeck et al.

(10) Patent No.: US 6,542,199 B1
(45) Date of Patent: Apr. 1, 2003

(54) CADENCE EDITING

(75) Inventors: Kevin Manbeck, Cranston, RI (US);
Chengda Yang, Auburndale, MA (US);
Donald Geman, Amherst, MA (US);
Stuart Geman, Providence, RI (US)

(73) Assignee: MTI Film LLC, Providence, RI (US)

( * ) Notice: Subject to any disclaimer, the term of this patent is extended or adjusted under 35 U.S.C. 154(b) by 0 days.

(21) Appl. No.: 09/643,084

(22) Filed: Aug. 21, 2000

Related U.S. Application Data

(60) Provisional application No. 60/150,016, filed on Aug. 20, 1999.

(51) Int. Cl.[7] .............................. H04N 7/01; H04N 11/20
(52) U.S. Cl. ..................... 348/459; 348/441; 348/458; 386/4; 386/52
(58) Field of Search ......................... 345/328; 348/441, 348/445, 458, 459, 552; 386/1, 4, 52, 55, 64, 131; H04N 7/01, 11/20, 11/00

(56) References Cited

U.S. PATENT DOCUMENTS

| | | | | |
|---|---|---|---|---|
| 5,754,248 A | * | 5/1998 | Faroudja | 348/441 |
| 5,821,991 A | * | 10/1998 | Kwok | 348/459 |
| 5,828,786 A | * | 10/1998 | Rao et al. | 348/439 |
| 5,844,618 A | * | 12/1998 | Horiike et al. | 348/441 |
| 5,872,600 A | * | 2/1999 | Suzuki | 348/459 |
| 5,929,902 A | * | 7/1999 | Kwok | 348/459 |
| 5,978,035 A | * | 11/1999 | Geshwind | 348/441 |
| 6,072,542 A | * | 6/2000 | Wilcox et al. | 348/700 |
| 6,115,499 A | * | 9/2000 | Wang et al. | 348/439 |
| 6,298,090 B1 | * | 10/2001 | Challapali et al. | 375/240.26 |

FOREIGN PATENT DOCUMENTS

| | | | | |
|---|---|---|---|---|
| EP | 0428073 A2 | * | 11/1990 | H04N/7/01 |
| EP | 0 428 073 A2 | | 11/1990 | |
| EP | 0 730 378 A2 | | 2/1996 | |
| EP | 0730378 A2 | * | 2/1996 | H04N/7/01 |
| EP | 0 849 736 A1 | | 12/1997 | |
| EP | 0849736 A1 | * | 12/1997 | G11B/27/031 |
| EP | PCT/US00/22960 | * | 12/2000 | |
| WO | WO-94/01971 | * | 1/1994 | H04N/7/01 |
| WO | WO 94/01971 | | 1/1994 | |
| WO | WO 97/39577 | | 10/1997 | |
| WO | WO-97/39577 | * | 10/1997 | H04N/7/01 |

OTHER PUBLICATIONS

Dickson, S., et al., "The Gemini Process: A Theatrical–Quality Video–to–Film Transfer Process," 23rd Annual SMPTE Television Conference, Feb. 3–4, 1989, pp. 30–35.*
EPO International Search Report, PCT/US00/22960, Dec. 19, 2000.

* cited by examiner

*Primary Examiner*—John Miller
*Assistant Examiner*—Brian Yenke
(74) *Attorney, Agent, or Firm*—Bromberg & Sunstein LLP

(57) ABSTRACT

A method for reordering an edited digital video sequence composed of digital video fields from multiple sources is disclosed. When the digital video sequence is reordered temporal cadence is provided which will allow for the conversion to a digital film format through a reverse 3:2 pulldown. Let $F^{old}=(F_1^{old},F_2^{old},\ldots,F_N^{old})$ be the given edited sequence of video fields. In one embodiment, the method calculates an instruction set which is then used to transform $F^{old}$ into a new sequence of video fields, denoted $F^{new}$, where most of the fields in $F^{new}$ come from $F^{old}$ and the remaining fields are "upconverted" fields from $F^{old}$. This reconstitution of $F^{old}$ is obtained by optimizing a set of instructions based on various constraints which express the characteristics of the pattern AaBbBcCdDd. By assigning a cost to each violation of the constraints, and to each disruption of the natural flow of time, and to other undesirable properties, a real-valued function is constructed. This real valued function can then be optimized through dynamic programming.

71 Claims, 11 Drawing Sheets

FILM

VIDEO

FILM FORMAT

AFTER 3:2 PULLDOWN

FIELD LABELS FOR VIDEO ORIGINATING MATERIAL

| | | |
|---|---|---|
| ODD FIELD | | V |
| EVEN FIELD | | v |
| ODD FIELD | FIRST FIELD AFTER CUT | V' |
| EVEN FIELD | FIRST FIELD AFTER CUT | v' |
| ODD FIELD | SECOND FIELD AFTER CUT | V'' |
| EVEN FIELD | SECOND FIELD AFTER CUT | v'' |

FIG. 5

FIELD LABELS FOR FILM ORIGINATING MATERIAL

| FIELD | FIRST FIELD AFTER A CUT | SECOND FIELD AFTER A CUT |
|---|---|---|
| A | A' | A'' |
| a | a' | a'' |
| $B_1$ | $B_1'$ | $B_1''$ |
| b | b' | b'' |
| $B_2$ | $B_2'$ | $B_2''$ |
| c | c' | c'' |
| C | C' | C'' |
| $d_1$ | $d_1'$ | $d_1''$ |
| D | D' | D'' |
| $d_2$ | $d_2'$ | $d_2''$ |

FIG. 6

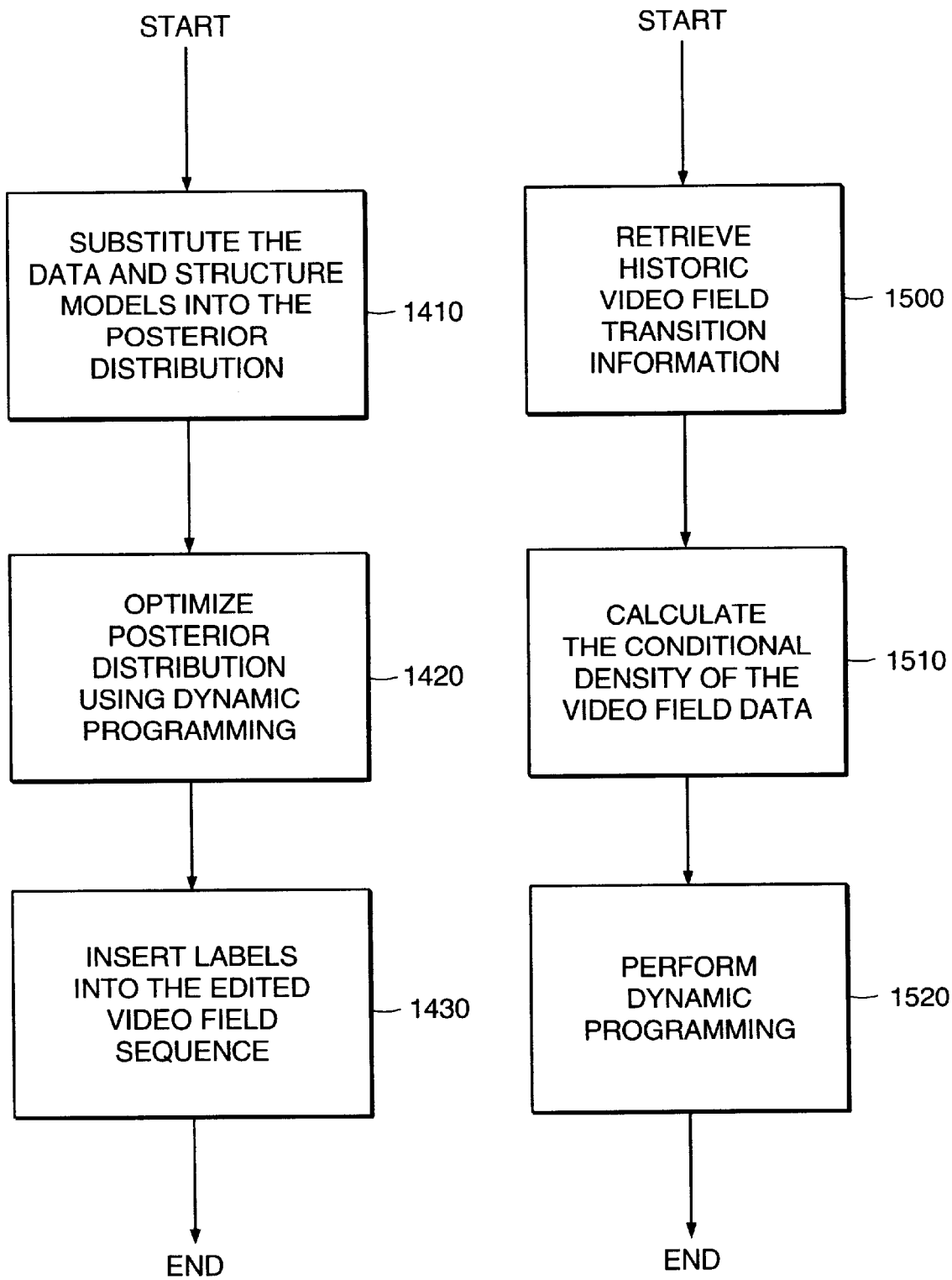

CADENCE EDITING

This application claims priority from U.S. provisional patent application serial No. 60/150,016 entitled "Cadence Editing" filed on Aug. 20, 1999 which is incorporated herein, in its entirety, by reference.

TECHNICAL FIELD

The disclosed invention is for use with film and more specifically with the processing of edited digital film and video.

BACKGROUND ART

Digital film is composed of multiple frames of digital data each corresponding to an image captured at a different point in time as shown in FIG. 1A. Currently, film is shot and displayed at 24 frames per second. In contrast, video is displayed at the rate of 60 "fields" per second as shown in FIG. 1B. A field consists of one-half the number of lines forming a complete image. In video, the odd and even lines of a complete image are displayed in successive fields. This process is known in the art as "interlacing."

In order to show digital film in a digital video environment the digital film data must undergo a conversion process known as "3:2 pulldown." 3:2 pulldown creates ten fields of video from four frames of film thus allowing a film sequence to be displayed at 60 fields per second. Let A, B, C, D represent four consecutive film frames and AaBbCcDd represents the four frames represented as 8 interlaced fields as shown in FIG. 2A. The ten corresponding video fields are then A, a, B, b, B, c, C, d, D, d where A, B, C, D represent, respectively, the odd lines of A, B, C, D and a, b, c, d represent, respectively, the even lines of A, B, C, D as shown in FIG. 2B. The odd lines of frame B and the even lines of frame D are used twice.

In the video industry, digital film sequences and digital video sequences are often edited together. After editing in which video originating material, film originating material (after 3:2 pulldown), and computer generated effects are combined, it is often desirable to return the edited video sequence back to a film format. A film format for a digital video sequence allows for efficient compression and theater display. Yet there is no direct and simple way to return to the 24 f/s film format without introducing visual distortions, which reduce the commercial value for broadcasting as well as degrade the output of standard forms of processing, such as MPEG compression.

For example, assume that two pieces of film are to be edited together and that there will be no mid frame splices; then there are 25 possibilities for the type of splice, corresponding to joining each of five possible types of cuts in first piece to each of five types in the second piece:

| | |
|---|---|
| 1) AaBbBcCdDd | A'a'B'b'B'c'C'd'D'd' |
| 2) AaBbBcCd | B'b'B'c'C'd'D'd' |
| 3) AaBbBc | B'c'C'd'D'd' |
| 4) AaBb | C'd'D'd' |
| 5) Aa | Dd' |

Each of the five sections in the first column can be joined to any of the five sections in the second column.

Returning the edited sequence to a film format requires reconstituting the sequence of fields into another sequence of (approximately) the same length which has the proper cadence. Each successive group of 10 fields could then be converted to 8 fields such that adjacent pairs (2n+1, 2n+2) correspond to the same instant in time, that during compression the locations of redundant fields are the same as after 3:2 pulldown.

Two of these 25 combinations are perfect" as they stand, namely pairing row 1 of the first column with row 1 of the second column, or pairing row 5 with row 2. Consider the (1,1) pairing, namely (A,a,B,b,B,c,C,d,D,d,A',a',B',b',B',c',C',d',D',d').

This means that either a section of material composed of whole cycles (contiguous fields of size ten starting with type A) was removed during editing or perhaps that such a section was inserted elsewhere in the sequence, but precisely between two adjacent cycles. In this case, a sequence of two cycles could be created directly from these 20 fields, namely (A,a,B,b,C,c,D,d,A',a',B',b',C',c',D',d')

The corresponding (virtual) film frames are A,B,C,D,A',B', C',D', obtained by simply deleting one copy of each of the fields B,d,B',d' and reordering the remaining fields as indicated. The (5,2) pairing, namely (A,a,B',b',B',c',C',d',D',d')

might occur, for example, if the section BbBcCdDd is edited out. In this case, the natural rhythm could be recovered by creating four film frames, namely A,B',C'D', where A=(A, a),B=(B'b'), etc.

SUMMARY OF THE INVENTION

Digital video, whatever its origin, is usually heavily processed, due especially to standard editing and the introduction of special effects. The disclosed method determines an instruction set for reordering an edited digital video sequence composed of digital video fields from multiple sources. When the digital video sequence is reordered temporal cadence is provided which will allow for the conversion to a digital film format through a reverse 3:2 pulldown.

Let $F^{old}=(F_1^{old}, F_2^{old}, \ldots, F_N^{old})$ be the given edited sequence of video fields. The method calculates an instruction set which is then used to transform $F^{old}$ into a new sequence of video fields, denoted $F^{new}$, where most of the fields in $F^{new}$ come from $F^{old}$ and the remaining fields are "upconverted" fields from $F^{old}$. This reconstitution of $F^{old}$ is obtained by optimizing a set of instructions based on various constraints which express the characteristics of the pattern AaBbBcCdDd. By assigning a cost to each violation of the constraints, and to each disruption of the natural flow of time, and to other undesirable properties, a real-valued function is constructed. This real valued function can then be optimized through dynamic programming.

One constraint used to define the instruction set is that only orphan fields are upconverted. An orphan field is defined as a field which does not have a partner field of the opposite parity. For example, in the sequence AaBbV-vcBbDd the field c is an orphan field whereas field A has partner field a. Further, the constraint applies upconversion only when the "cost" for upconverting is less than that of any other method of restoring cadence by re-arranging existing fields. Another constraint which is used to determine the instruction set is that the ordering of the fields in $F^{new}$ is preserved from $F^{old}$. A further constraint is that the number of fields in the old and the new video sequence should be approximately equal.

After the cost for the instruction set is minimized, $F^{old}$ is reordered into $F^{new}$ such that each successive group of ten fields is of the form AaBbBcCdDd and thus the video field sequence of $F^{new}$ has perfect cadence. Once $F^{new}$ is determined, the new sequence of fields is converted to a film format, where each film frame corresponds to two video fields. The conversion is achieved by deleting the fifth and tenth fields of each cycle of ten fields of $F^{new}$ and reversing the order of cC and dD.

In one embodiment, the constraints are defined in terms of video field labels. Video field labels are labels assigned to the video fields as defined in U.S. provisional patent application serial No. 60/150,020 entitled "Video Field Labeling" filed on Aug. 20, 1999 which is incorporated herein, in its entirety, by reference. The video field labels convey information about the origin of the fields in $F^{old}$, namely whether each one is film-originating or video-originating, odd or even, and its location relative to edit points, and the location in the AaBbBcCdDd cycle in the case of film-origination.

In another embodiment perfect cadence is obtained using an alternative procedure. First video field labels are determined for the edited video field sequence. Based on the designated labels, orphan fields are determined through a quick label comparison and the orphan fields are marked. The method then eliminates repeated fields. For example, the third field of a three field sequence forming a pattern of first repeated odd field, even field, second repeated odd field of the form BbB or first repeated even field, odd field, second repeated even field of the form dDd is eliminated.

The edited video field sequence then undergoes a reordering for all film frames so that each pair of video frames is ordered such that it is an odd/even pairing. Then all fields designated as video-field-originating undergo motion compensated standards conversion or are uniformly decimated, such that 60 video originating fields are decimated to 24 fields and then the 24 fields are each upconverted resulting in 24 frames. After the video frames are converted, a decision is made regarding the marked orphan fields. The overall temporal length of the video sequence is determined for the video at a rate of 24/frames per second and this is compared to the overall temporal length of the original edited video sequence which is displayed at 60 fields per second.

Orphan fields are either upconverted to increase the temporal length of the new sequence so that the temporal length is identical to the edited video field sequence or the orphan fields are dropped to decrease the overall temporal length of the new film format video sequence. A further step may include performing a 3:2 pulldown on the new film format video sequence.

BRIEF DESCRIPTION OF THE DRAWINGS

The invention will be more readily understood by reference to the following detailed description of specific embodiments taken with reference to the accompanying drawings in which:

FIGS. 5–11 explain the process for finding video field labels for the edited video field sequence;

FIG. 5 shows a table of the possible states for a video originating field;

FIG. 6 shows a table of the possible states for a film originating field;

FIG. 7 shows the steps needed to determine the set of labels for a video sequence;

FIG. 8 shows the steps taken in creating the structure model;

FIG. 9 shows the steps taken in constructing the data model;

FIG. 10 shows the steps for determining the labels from the posterior distribution;

FIG. 11 shows an exemplary method for determining labels for video fields in a video sequence;

DETAILED DESCRIPTION OF SPECIFIC EMBODIMENTS

In the detailed description and the appended claims let F denote a sequence of video fields and let $X=(x_1, x_2, \ldots) x_N)$ denote a desired sequence of labels. Each video field $F_n$ is assumed to have three intensity arrays $(F_n^{(1)}, F_n^{(2)}, F_n^{(3)})$. The physical interpretation of the intensity value $F_n^{(I)}$ for I=1, 2, 3 is determined based on the color coordinate system. Common examples are red, green and blue, or one luminance and two chrominance values. Although the disclosure uses three intensity arrays to represent a video field it should be understood by one of ordinary skill in the art that there are other representations of a vdeo field that may also be used.

Figure 1A:
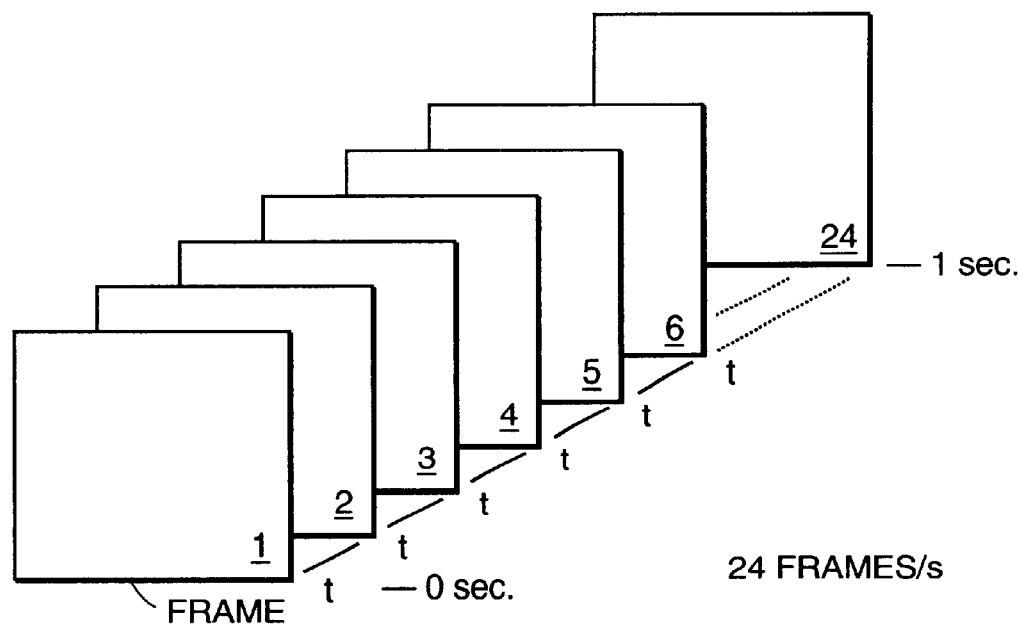
FIG. 1A shows film composed of multiple frames.
Figure 1B:
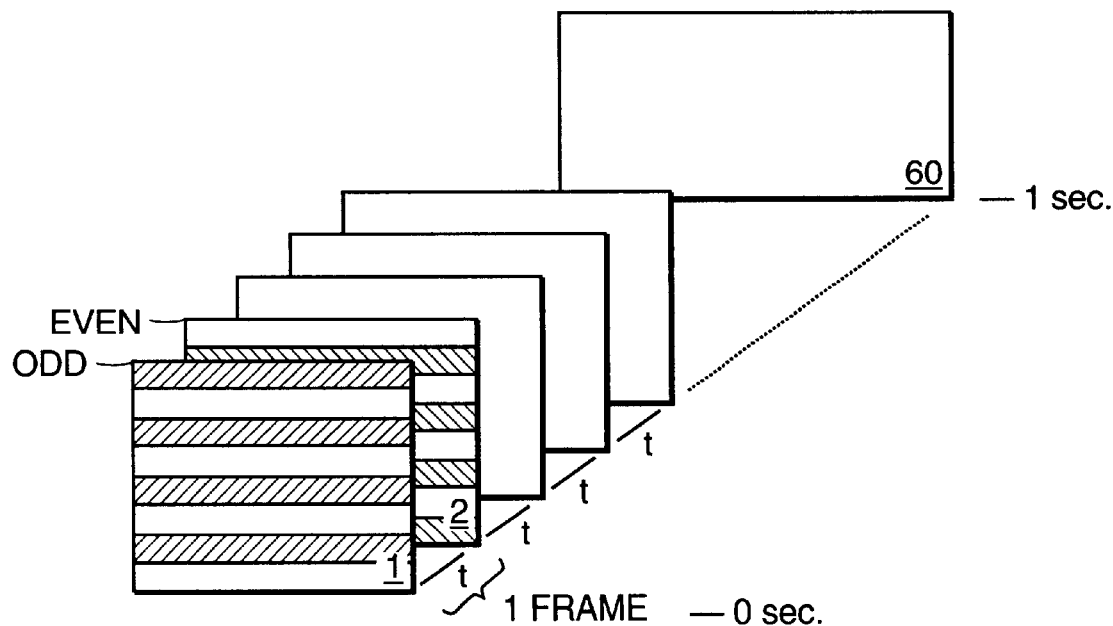
FIG. 1B shows video composed of multiple fields.
Figure 2A:
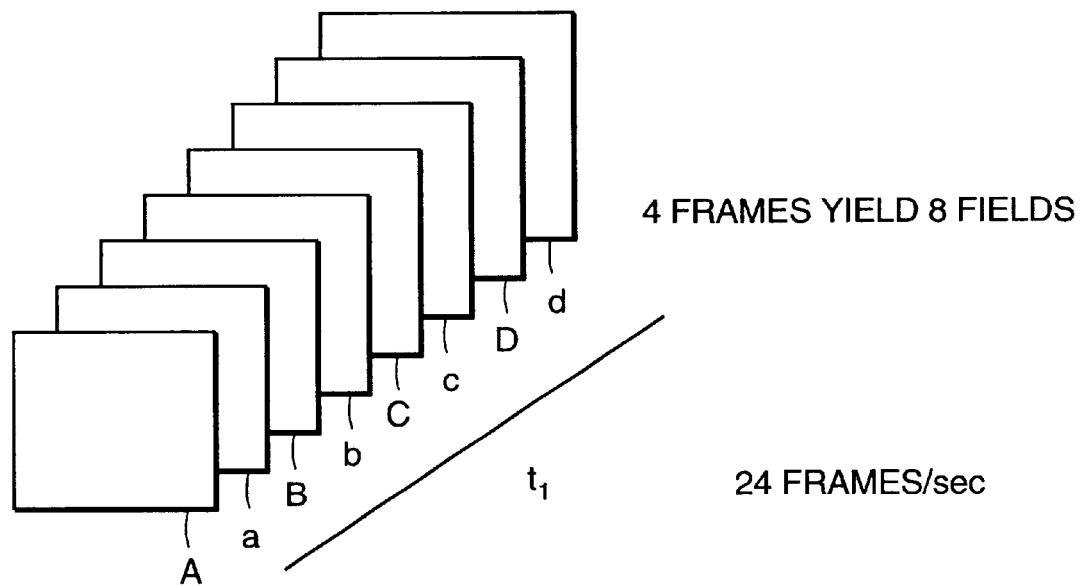
FIG. 2A shows film which is digitized and composed of fields.
Figure 2B:
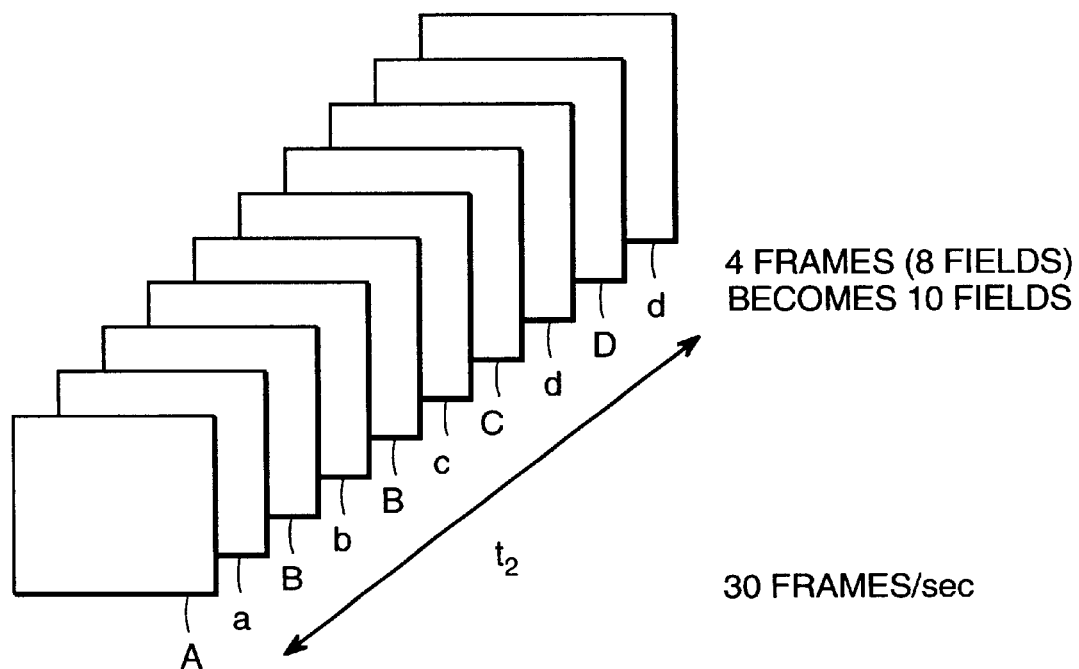
FIG. 2B shows film in the form of FIG. 2A which has undergone 3:2 pulldown.
Figure 3:
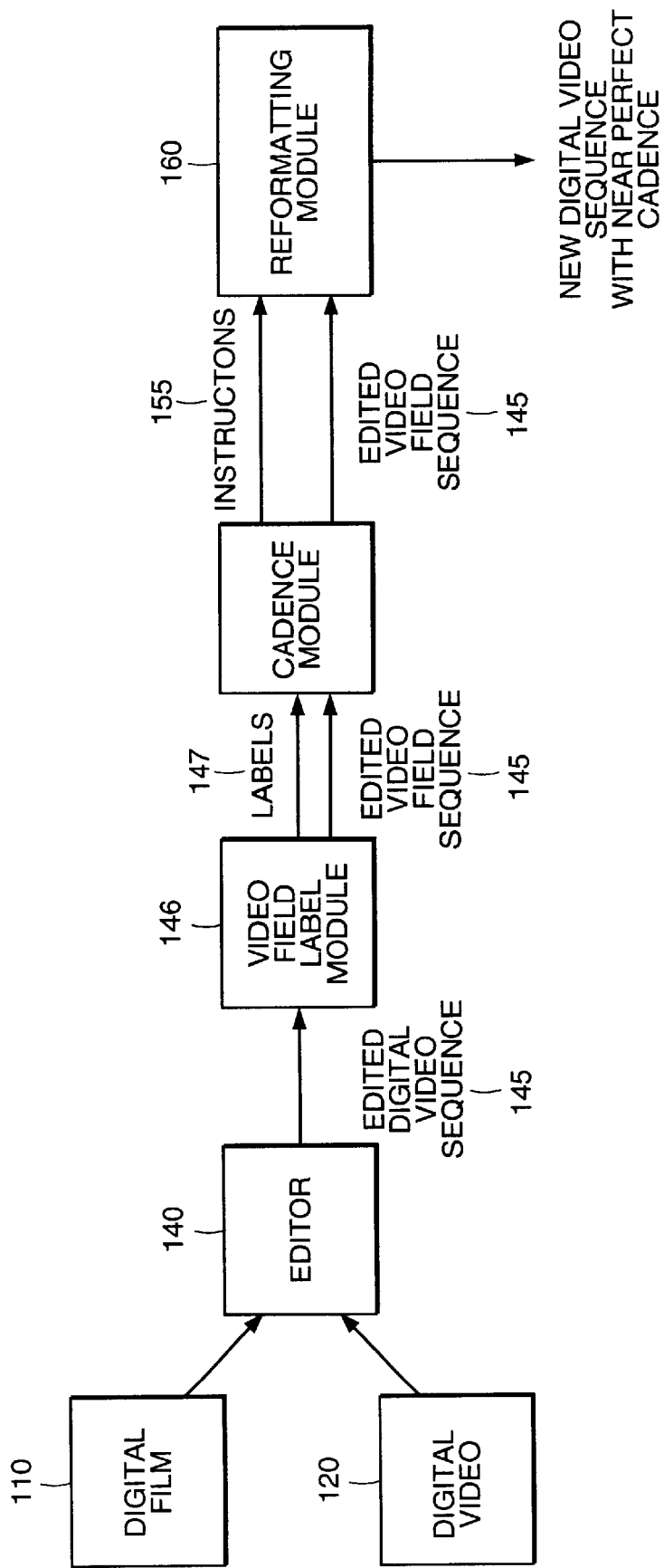
FIG. 3 shows the modules which are used in conjunction with cadence editing.

FIG. 3 shows a digital film sequence 110 and a digital video sequence 120 being input into an editor 140 which results in an edited digital video field sequence 145 which contains a mixture of the two sources. Prior to editing, a film originating sequence is converted to a digital film sequence through the use of an analog to digital converter. The film source is then transformed so that it may be displayed at the rate of 30 frames per second which is equivalent to 60 fields per second. This transformation is known as "3:2 pulldown" and establishes a correspondence between each consecutive set of four film frames and ten video fields. The video sequence takes the form of $AaB_1bB_2cCd_1Dd_2$ (The fields marked with subscripts indicate that the field is a repeated field for example $B_1$ and $B_2$ are identical fields). This correspondence is necessary for efficient MPEG compression, conversion from video to film format (e..g, to show a TV commercial in a movie theater), and other numerical procedures, many of which are driven by recent developments in high definition broadcasting and the expanded role of digital video disks (DVD). After 3:2 pulldown the digital film sequence is placed into the video editor 140. Prior to entering the editor, the video originating sequence is either originally in analog or digital form. If it is in digital form, it is passed directly to the editor as a digital video sequence; if it is in analog form it undergoes a conversion to digital in an analog to digital converter so that the video sequence is interlaced and takes the form of $V_1v_1V_2v_2 \ldots V_nv_n$.

Editing a video sequence in an editor causes (electronically) cutting and splicing of the digital film sequence so that perfect cadence is lost. Perfect cadence allows the originating frame from a digital film sequence to be determined based upon the location of the field in the overall sequence. Prior to any editing, the digital film sequence in 3:2 format entails complete sequences of ten consecutive fields, denoted ($AaB_1bB_2cCd_1Dd_2$, $AaB_1bB_2cCd_1Dd_2$, $AaB_1bB_2cCd_1Dd_2$ ...). After editing the redundant pattern of ten frames is lost due to the addition of the digital video sequence ($V_1v_1V_2v_2V_3v_3$ ...) into the digital film sequence. It should clear that video fields that are computer generated such as special effects may be considered video originating fields without providing a separate designation. In the following detailed description, perfect cadence shall refer to the pattern exhibited by a digital film sequence after 3:2 pulldown ($AaB_1bB_2cCd_1Dd_2$).

After the material is edited, an edited digital video field sequence is produced 145. The digital video field sequence is passed to a video field labeling module 146 in which video field labels are determined for the edited video field sequence. The edited video field sequence and the video field labels 147 are passed to a cadence module 150. The cadence module produces an instruction set 155 for reorganizing the digital video fields from the edited digital video sequence 145 so that the new digital video sequence has perfect cadence. The instruction set 155 is determined by optimizing a cost function which is composed of constraints for the digital video sequence. The constraints are defined so that the reorder sequence will have perfect cadence.

The instruction set 155 and the digital video field sequence 145 are passed to a reformatting module 160. After the instruction set is determined in certain instances it may be necessary to create a new field based upon an orphaned field. The process of creating the new field is done by upconversion and is known to those of ordinary skill in the art. The reformatting module 160 implements the instructions in the instruction set. The reformatting module 160 reorders the digital video sequence and incorporates in the upconverted video fields according to the instructions. When the fields are reordered, the new digital video sequence has perfect cadence such that there is a repeated pattern of the form (($AaB_1bB_2cCd_1Dd_2$, $AaB_1bB_2cCd_1Dd_2$, $AaB_1bB_2cCd_1Dd_2$ ...). The new digital video sequence can then be converted to a digital film format through a standard conversion wherein the fifth and tenth fields of each sequence of ten fields are discarded and fields 6 and 7 and fields 8 and 9 are switched such that the final film formatted digital sequence has the form (AaBbCcDd, AaBbCcDd, Aa,Bb,Cc,Dd ...).

Figure 4:
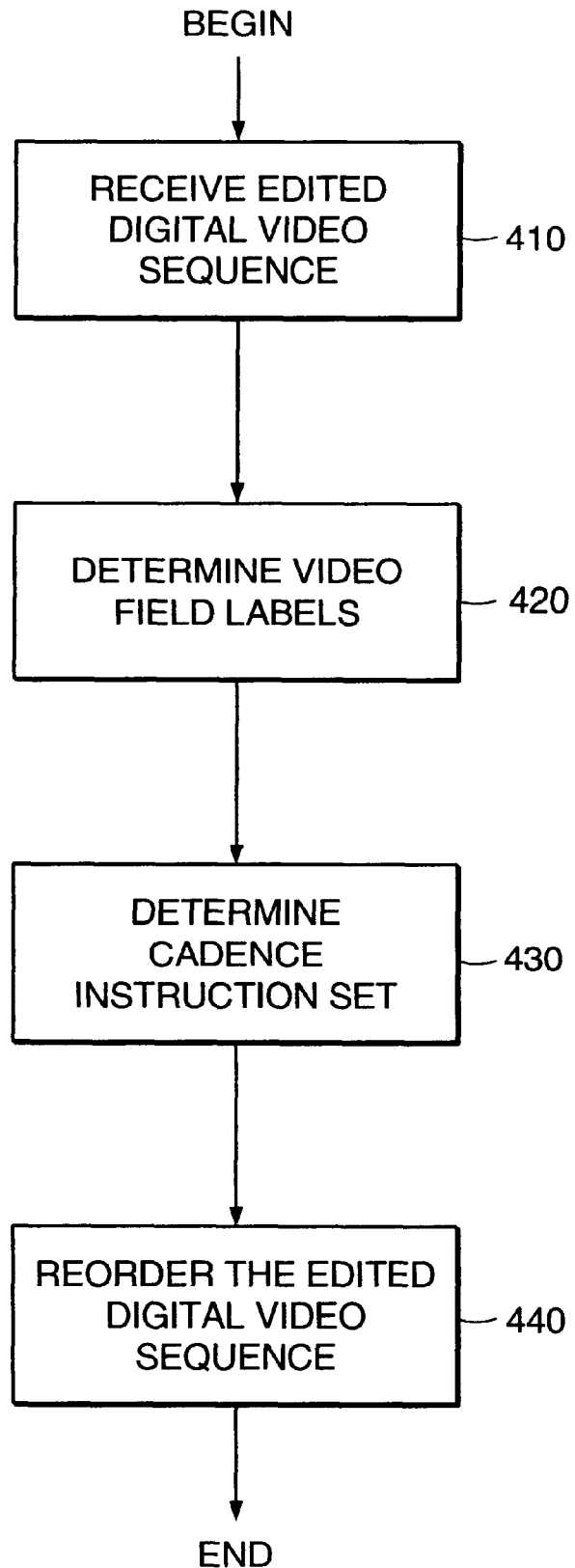
FIG. 4. shows the steps used in the method of cadence editing.

The steps which are used in the method of cadence editing are shown in FIG. 4. A digital video field sequence which has been edited and is composed of digital material from different originating formats is received into a processor or computer (Step 410). In the preferred embodiment, the methodology for cadence editing is performed on a processor or computer and the edited digital video sequence is received into the computer. From the edited digital video sequence, video field labels are determined for the video fields which make up the edited digital video sequence (Step 420). The video field labels provide indicia as to origin. The labels indicate whether the video frame is video originating, film originating. In the preferred embodiment, the letters Aa,Bb,Cc,Dd are indicia of film, Vv for video. Additionally, the video fields indicate the location of any edits. For example, the fields immediately after an edit are given a special annotation. A field may be designated with a single prime indicating that it is immediately after an edit and a field with a double prime indicates that the field is the second field after an edit. The video field label also indicate whether the field is a redundant field. A subscript numeral may be used to indicate that the field is a repeated field. Finally the video field label indicates the frame from which the video field originates if the video field is film originating. The video field label of $B_2'$ indicates that the field is film originating, that the field is immediately after an edit, that it is the second repeat of the field and that the field is from the second of four frames of a film sequence. The methodology for obtaining video field labels for an edited video field sequence is provided below.

Once the video field labels are determined for video field sequence the cadence instruction set is determined (Step 430). The instruction set allows for the restructuring of the video field sequence so that it has exactly the same temporal cadence as film-originating material immediately following 3:2 pulldown. Global optimization is used to find a mapping which assigns an edit or "instruction" label $Z_n$ to each original video field which describes the status of that field in the new, regular sequence. The label $Z_n$, for field n, indicates which field is to be used in position n from the original video field sequence and whether that field must be created ("upconverted") from an "orphan" field. The instruction set is determined by minimizing a "cost function" over all possible sets. This function takes into account the various distortions resulting from normal editing, as well as, the global constraint of maintaining the natural flow of time and the overall length of the sequence. The minimizing instruction set maintains the natural rhythm of each scene to the greatest extent possible consistent with the format constraints. By assigning a cost to each violation of the constraints, and to each disruption of the natural flow of time, and to other undesirable properties, a real-valued function is constructed, such that $$\Phi(Z;X)=\Sigma\lambda_k\Phi_k(Z;X)$$

where each $\Phi_k$ corresponds to one type of constraint. X is the video field label sequence and $\lambda_k$ is a constant which may be used for weighting the constraints differently. The numerical value of $\Phi_k$ indicates the extent to which that constraint is satisfied, with $\Phi_k=0$ representing total compliance, and hence, no cost. The optimal instruction set is defined as the value of Z=Z(X) which minimizes $\Phi$.

Next the video fields from the edited video field sequence are restructured into a new video field sequence ($F_1^{new}$, $F_2^{new}$, ..., $F_{10}^{new}$), $F_{11}^{new}$, $F_{12}^{new}$, ..., $F_{20}^{new}$), etc. (Step 440). The instruction set may contain instructions that a video field is to be discarded, placed at a particular location in the new sequence or, if the video field is an orphan field, that the field needs to be upconverted. The fields which need to be upconverted are done so be processes known to those skilled in the art. For instance, the video fields may be interpolated from the orphan field. The fields are then placed into the proper sequence and the new video field sequence is structured to have perfect cadence such that there is a repetition of the form ($AaB_1bB_2cCd_1Dd_2$), ($AaB_1bB_2cCd_1Dd_2$), ($AaB_1bB_2cCd_1Dd_2$).

FIGS. 5–11 show the steps taken in determining the video field labels. Once the video field sequence is edited, the video field labeling method determines labels for each field which indicates the origin of the fields $F_1$, ..., $F_N$ (film-originating or video-originating), and the field's location relative to edit points and the position within the cycle AaBbBcCdDd in the case of film-originating material. In the preferred embodiment, each $X_n$ (label), assumes one of 36 possible "states." FIG. 5 shows a table showing the first six states for video originating material in this implementation. The state is $X_n$=V if the field is odd and video originating or $X_n$=v if the field is even and video-originating. Each field that immediately follows an edit is designated with a prime so that $X_n$=V' or $X_n$=v'. Additionally, the second field after a cut is designated with a double prime so that $X_n$=V" or. $X_n$=v" depending on whether the field is an odd or an even field.

The remaining 30 states of the 36 possible states of the preferred embodiment refer to film-originating material as shown in FIG. 6. The 10 basic states are A, a, $B_1$, b, $B_2$, c, C, $d_1$, D, $d_2$ indicating relative position within the 10 video fields which result from the 3:2 pull down process applied to the four consecutive film frames. Ten more states, denoted with a prime (A', a', B', $B_1$', b', $B'_2$, c', C', $d'_1$, D', $d'_2$) signify the field is right after a cut; the final ten contain a double prime,(A", a", $B"_1$, b", $B"_2$, c", C", $d"_1$, D", $d"_2$) and indicate that the field is the second field after a cut. It should be understood by those of ordinary skill in the art that other state spaces may be used having more or less states than the enumerated 36 states above.

As expressed above, editing, such as cutting, splicing, and introducing special effects, such as fades, disrupts perfect cadence. Perfect cadence refers to a repeated pattern of the form AaBbCcDd in successive cycles of size ten in a video sequence. In this redundancy pattern, each of the four pairs (A, a), (B, b), (C, c), (D, d) corresponds to the same instant in time for both the video sequence AaBbCcDd and the interlaced version of the film sequence (A, a), (B, b), (C, c), (D, d).

For example, in an edited video sequence the actual cadence might be

X=(A, a, $B_1$, b, $B_2$, c, $B'_2$, c", C, $d_1$, D, $d_2$, V', v", V, v, . . . )

In most edited video sequences, the redundant fields are not where they are expected to be immediately after 3:2 pull down. In the above example three pieces of video have been joined, one of the form A, a, $B_1$, b, $B_2$, c, the second is of the form $B_2$, c, . . . And the third V', v", V, v. Let "1" indicate a field which is "not redundant" (i.e., not previously appearing in the sequence) and "0" indicate "redundant" (i.e., previously appearing). Then the actual labeling of the segment in is 1, 1, 1, 1, 0, 1, 1,1,1,1,0, . . . However, compression routines drop every fifth field and hence the pattern expected is 1, 1, 1, 1, 0, 1, 1, 1, 1, 0, 1, 1, 1, 1, . . .

Determining the states and therefore the labels is performed by estimating so-called "hidden variables" from two sources of information: first, the "observed variables" and second, the prior information about the internal structure of the hidden variables. The observed variables are functionals of the video data forming the video fields, such as luminance and chrominance values carried by F. Each hidden variable $X_n$, $1 \leq n \leq N$, assumes one of 36 possible states as described above; thus, there are $36^N$ possible states for X. Through optimization the most likely sequence of labels is selected from the $36^N$ possible global states based on the video sequence.

The labels are determined by finding the most likely state of the hidden variables consistent with the given data F. Denoting the optimal solution by X*, the labels are the value of X which maximizes the "posterior distribution" where Y=($y_1$, . . . ,$y_N$) represents a scalar representation of the multi dimensional video sequence ($F_n^{(1)}$,$F_n^{(2)}$, $F_n^{(3)}$).

The posterior distribution is $$P(X \mid Y) = \frac{P(X, Y)}{P(Y)}$$

and represents the conditional probability distribution for the states given a scalar functional representation of the video fields.

In other words, the output of the process is the state $$X^* = X^*(Y) = \underset{x}{\mathrm{argmax}}(P(X \mid Y))$$

where Y={$Y_n$(F), n=1, . . . , N} consists of scalar functionals of the video fields. For example, a scalar functional for a field might be the distance between the current field and the next field.

Figure 7:
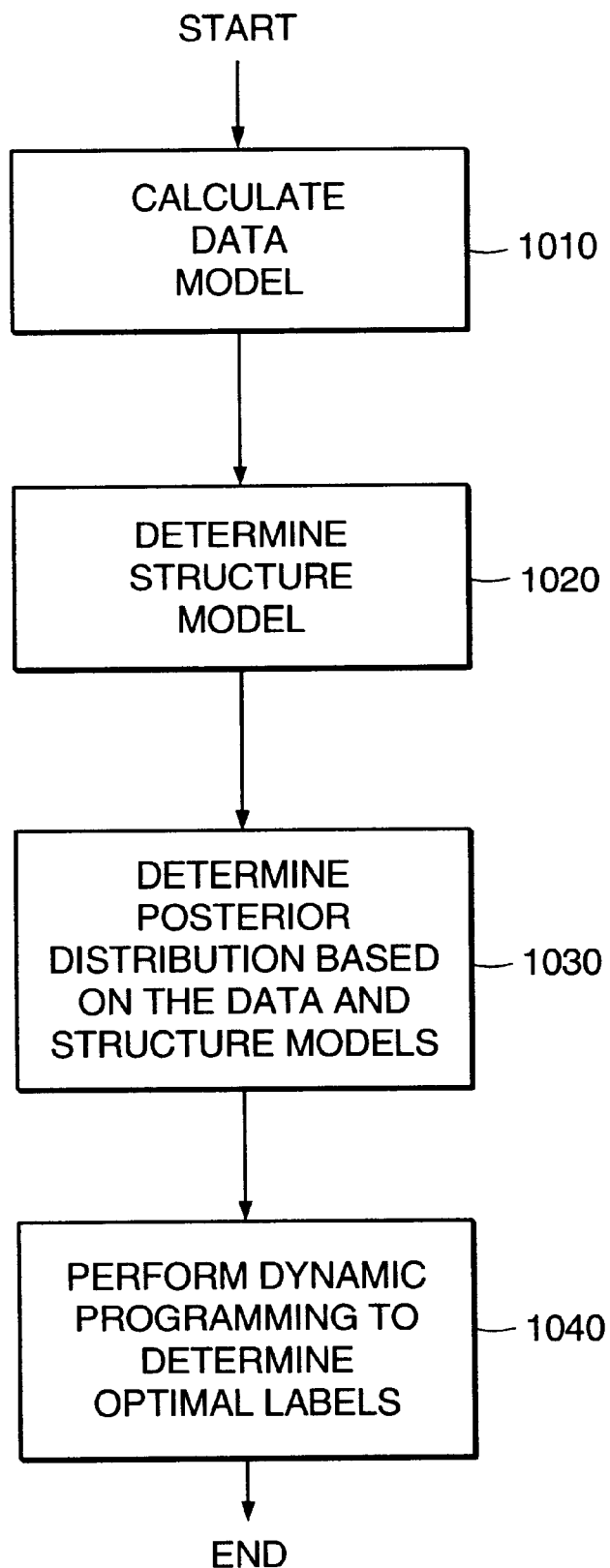

To determine the labels the following method is employed as shown in FIG. 7. First a "data model" is calculated (Step 1010). The data model is one of two components in the joint probability distribution P(X,Y). The "data model" quantifies the interaction between the scalar functional representations of the raw data and the labels. These interactions are expressed in the form of a conditional probability distribution of the functionals $Y_n$(F), n=1, . . . , N, given the true labels. This conditional distribution captures the likelihoods of observing the scalar functional representation of the video fields given the true labels of the individual fields. The data model is of the form $$P(Y_n(F), n = 1, \ldots, N \mid X) = \prod_{n=1}^{N} P(Y_n(F) \mid X).$$

The structure model which is the second half of the joint probability distribution is defined (Step 1020). The "structure model" expresses the internal structural behavior of the label process, i.e., the regularities within the label sequence which are expected to be present independently of the particular video sequence. The modeling is stochastic, and hence the structure model (or "prior distribution") is also a probability distribution, P(X). It should be understood, that the structure model and the data model may be calculated in any order or simultaneously.

The posterior distribution $$P(X \mid Y) = \frac{P(X, Y)}{P(Y)}$$

is then computed for optimization (step 1030). First, the data model and the structure model are combined to form the joint probability distribution P(X,Y)=P(Y|X)P(X). The joint distribution has a Markov structure whose underlying graph reflects the natural interactions within each component X and Y separately, as well as between X and Y. For example, pairwise interactions in Y might arise due to common fields appearing in the definition of $Y_i$ and $Y_j$ and interactions between $X_n$ and $Y_n$ are designed to reflect the dependence of the distribution of $Y_n$ on the label of the fields in the vicinity of $F_n$.

The posterior distribution of the Markov model is then expressed as:

$$P(X \mid Y) = \frac{P(Y \mid X)P(X)}{P(Y)}$$

where $$P(Y) = \sum_x P(Y \mid X)P(X)$$

Taking logarithms, and noting that P(Y) does not depend on X and that the logarithm is an increasing function, we arrive at a rearranged posterior distribution which may be used to calculate the optimized labels.

$$X^* = X^*(Y) = \underset{x}{\operatorname{argmax}}[\log P(Y \mid X) + \log P(X)]$$

Finally, dynamic programming is used to compute X* based on the corresponding extreme value problem (Step 1040).

Figure 8:
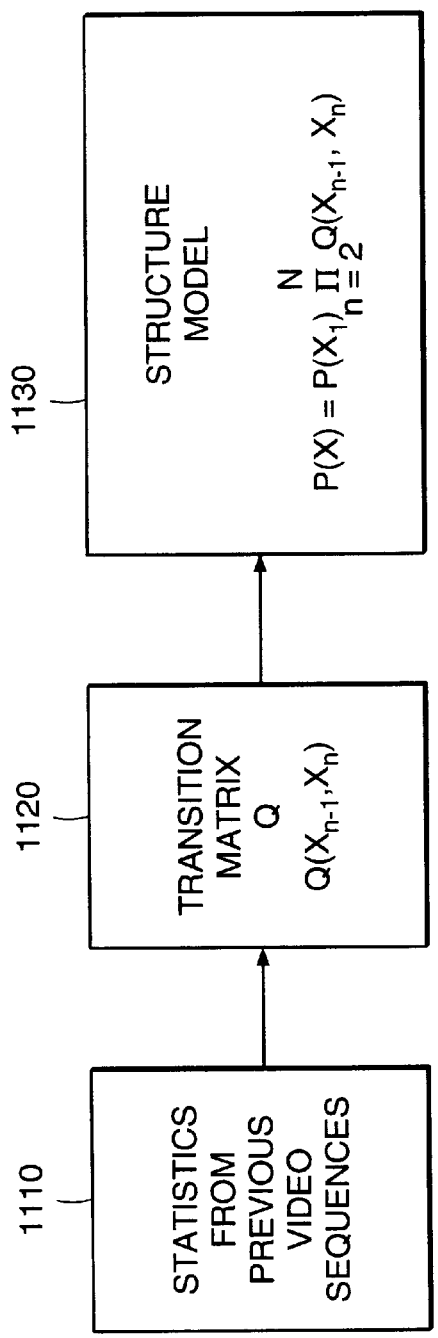

FIG. 8 shows the steps taken in creating the structure model. Historic video information is collected and stored in a memory location 1110. This historic video information is estimated from large samples of video data by collecting statistics on the frequency of occurrence of the various one-step transitions A→a, a→B$_1$, a→D', etc. Such information includes location of edit points as indicated by the apostrophes and the origin of the video sequences as indicated by the letters. This compilation of data is converted into a matrix known as a transition matrix or Q matrix for each of the various one step transitions 1120. For example, in a system having 36 possible states as shown in FIGS. 5 and 6, the transition matrix has $36^2$ possible transitions. It should be understood to those of ordinary skill in the art that the Q matrix is constructed for mathematical simplification and the structure model may be expressed simply as P(X).

In order to illustrate the typical behavior of video data, we consider several examples of the rows of Q, that is, of probability vectors Q(x, y), y∈S, for selected values of x∈S. For example, if x=A, the normal, expected transition is A→a and most of the mass of the vector Q(A, y), y∈S, resides in the term Q(A, a). The remaining mass (roughly 0.05) is distributed about equally among the fields with parity opposite to A and immediately following a cut, namely the six states y∈{a', b', c', d'$_1$, d'$_2$, u'} Similarly, when x=a, most of the mass of the corresponding row resides in Q(a, B$_1$) because the expected pattern is AaBbBcCdDd. Virtually all the rest of the mass is distributed among the states y∈{A', B'$_1$, B'$_2$, C', D', V' evenly}.

In yet another example, suppose the state x of the field F$_{n-1}$ indicates that F$_{n-1}$ is the first field after a cut, for example x=A'. The most common scenario is A'→a". That is, the field at time n has label a", indicating that it occurs two steps after a cut. However, it is possible, though rare, that another cut occurs immediately, in which case there might be a transition from x=A' to one of the states y∈{a', b', c', d$_1$', d$_2$',u'}. It should be understood that many of the possible transitions are extremely rare (or in fact impossible) and hence the Q matrix has many zero values.

From the transition matrix, the structure model can be created 1130. The structure model takes the form of a first-order, homogeneous Markov chain which can be represented as follows:

$$P(X) = P(X_1) \prod_{n=2}^{N} P(X_n \mid X_{n-1})$$

$$P(X) = P(X_1) \prod_{n=2}^{N} Q(X_n, X_{n-1})$$

In order to simplify the computations, most of the entries of the Q matrix are set to zero. Again, the non-zero values are estimated from video material using standard parameter estimation techniques such as maximum likelihood although other estimation techniques may be used.

Figure 9:
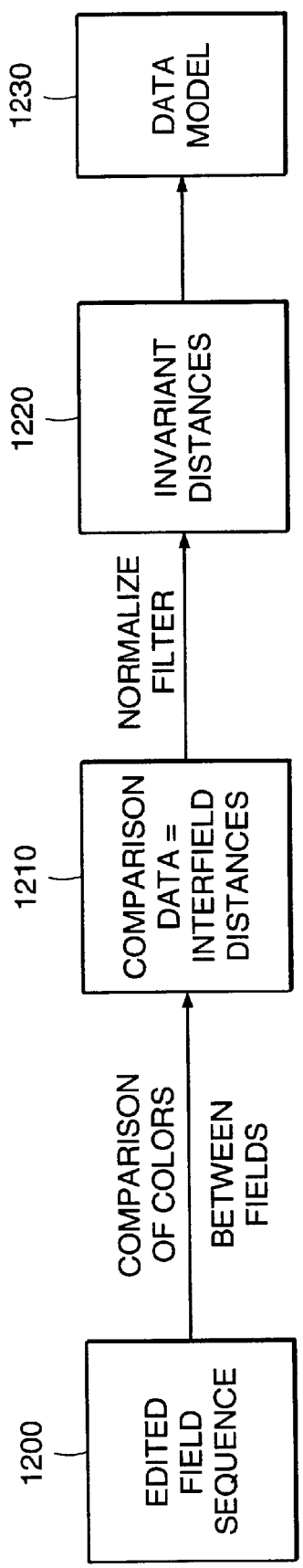

FIG. 9 shows the steps taken in constructing the data model. From the edited field sequence the functionals are compared (step 1210). In the case of a video data sequence in which each field is composed of three arrays of data, one each for each R,G, B or for Y, U, V a distance is determined between fields. Denote the j'th pixel of $F_n^{(i)}$, I=1, 2, 3, by $F^{(i)}_{n,j}$, j=1, ... ,J. Thus, for example, J=243×720 when the resolution of full digital video frames is 486×720. The distance is determined as the functional:

$$S_n = S_n(F) = \frac{1}{3J} \sum_{i=1,2,3} \sum_{j=1,\ldots,J} \frac{|F^{(i)}_{n,j} - F^{(i)}_{n-2,j}|}{F^{(i)}_{n,j} + F^{(i)}_{n-2,j}}, n = 3, \ldots, N.$$

The scalar $S_n$ is a measure of the discrepancy between fields $F_n$ and $F_{n-2}$ and assumes values in the interval [0, 1]. Measuring the distance between fields two units apart restricts comparisons to fields of the same parity-odd to odd or even to even. The scalar functional of the equation for $S_n$ is the sum of the absolute difference of n and n−2. It should be understood that other scalar values may be used to represent a field. For example, the squared difference or a weighted difference. It should be understood that $S_n$ only need be a representation of the video data in the described embodiment. $S_n$ can be any reasonable measure of the "distance" between $F_n$ and $F_{n-1}$.

In order to stabilize and normalize the functionals $S_n$, two additional operations are performed. First, the intensity differences are filtered (step 1220) in that $|F^{(I)}_{n,j} - F^{(I)}_{n-2,j}|$ is set to zero if the difference is less than predetermined a threshold; this makes the results robust to noise and other small, fluctuations. Although the step of filtering is useful it is not required for the method. Second, the functionals are adjusted for normal statistical fluctuations and normalized by replacing each $S_n$ by $$Y_n = \frac{S_n}{M_n + S_n}$$

where $M_n$ is the median value of the five numbers {$S_{n-2}$, $S_{n-1}$, $S_n$, $S_{n+1}$, $S_{n+2}$}. It should be understood that $Y_n$ could be derived in different manners. For example, $M_n$ could be the value of the twenty-fifth quantile or the seventy-fifth quantile rather than the median (fiftieth quantile) which would provide $Y_n$ with a different weighting. $Y_n$ need only be a representation of the video data. For instance, $S_n$ could be used for $Y_n$. It should be understood that $Y_n$ can be a functional representation of a video field or a vector representation in alternative embodiments. In alternative embodiments, both $S_n$ and $Y_n$ may not even be necessary as the data model may be represented as the conditional probability of the original video field sequence itself given the set of labels. That is the video field data is not represented by a scalar value, but is instead represented by the actual video field data or a vector representation of the video field data or a functional representation of the video field data or another representation.

As stated above, the data model stipulates the conditional probability distribution of the normalized functionals Y=(Y$_3$, ... Y$_N$) given the label values X. In the model, the individual variables Y$_3$, ... , Y$_N$, are assumed to be conditionally independent. Therefore, only the univariate conditional distributions P(Y$_n$=y|X), n=3, ... , N, need be specified. Another assumption is that the distribution of Y$_n$ given X depends only on X$_n$, the label for field F$_n$. This assumption is reasonable due to the relatively large amount of information carried by the state space S. There are three mutually exclusive and exhaustive cases for the data model P(Y$_n$=y|X,) depending on the nature of the state X$_n$. In each case the distribution of Y$_n$ conditional on X$_n$ is assumed to be a Gaussian distribution with a case-dependent mean and variance. It should be understood by those of ordinary skill in the art that other distributions may be used in place of a Gaussian distribution based upon the type and nature of the input data which the probability distribution is representing.

The three cases mentioned above are repeated fields, different frames, and intervening cuts. For repeated fields, if for example $X_n=B_2$, then the two labels preceding $X_n$ are expected to be $X_{n-2}=B_1$ and $X_{n-1}=b$. Although it is possible that the video has been cut between n−2 and n, the normalized distance $Y_n$, between the vector fields $F_{n-2}$ and $F_n$ is usually relatively small. The same is true when $X_n=d_2$, in which case the most likely scenario is $(X_{n-2}, X_{n-1}, X_n)=(d_1, D, d_2)$. In the second case, if there are different frames, $X_n \in \{A, a, B_1, b, C, c, D, d_1, V, v\}$, and no cut intervenes between n−2 and n, then fields $F_{n-2}$ and $F_n$ come from different frames and their distance apart, $Y_n$ is expected to be larger than for repeated fields. For an intervening cut, $X_n$ denotes a label indicating a field either immediately following a cut (A', a', etc.) or two fields after a cut (A", a", etc.), then we expect a much larger average distance between $F_{n-2}$ and $F_n$.

Let a(x) be an indicator of the case: let a(x)=1 if $x \in \{B_2, d_2\}$ for repeated fields, let a(x)=3 for different frames and let a(x)=2 for an intervening cut. Assuming a Gaussian probability distribution, the conditional density of $Y_n$ given $X_n=x$ is:

$$P(Y_n = y \mid X_n = x) = g(y \mid a(x)) = \frac{1}{\sqrt{2\pi}\,\sigma_{a(x)}} \exp - \frac{(y - \mu_{a(x)})^2}{2\sigma_{a(x)}^2}$$

where $\mu_1, \mu_2, \mu_3$ are the mean values of $Y_n$ in the three cases and $\sigma_1, \sigma_2, \sigma_3$ are the corresponding standard deviations. The mean values and the standard deviation values for each case are each determined based upon historic video sequence data. Both the standard deviation and the mean are determined by maximum likelihood estimation based on samples of $Y_n$ values. It should be understood by one skilled in the art that other parameter estimation techniques may be used.

The final data model is then the joint conditional density $$P(Y = y \mid X = x) = \prod_{n=3}^{N} g(y_n \mid a(x_n))$$

where $y=(y_1, \ldots, y_N)$ and $x=(x_1, \ldots x_N)$.

FIG. 10 shows the steps for determining the labels from the posterior distribution. The data model and the structure model which forms the term P(X,Y) are substituted into the posterior distribution P(X|Y)=P(X,Y)|P(Y) (Step 1410). The labels are then calculated from the posterior distribution. The posterior distribution is optimized to compute the state in which the probability of labels occurring is maximized (X\*=arg max [log P(Y|X)+log P(X)]) (Step 1420). In view of the data model, the first term in this optimization equation is $$\log P(Y = y \mid X = x) = \sum_{n=3}^{N} \log g(y_n \mid a(x_n))$$

where $g(y_n|a(x_n))$ is the conditional density with mean $\mu_a(x_n)$ and standard deviation $\sigma_a(x_n)$. Given the preferred structure model, the second term is $$\log P(X = x) = \log P(X_1 = x_1) + \sum_{n=2}^{N} \log Q(x_{n-1}, x_n).$$

As a result, the optimal labeling is represented as $$X^* = \underset{x}{\mathrm{argmax}}\,\Phi(x; y)$$

$$= \underset{x}{\mathrm{argmax}} \sum_{n=2}^{N} \Phi_n(x_{n-1}, x_n; y_n)$$

where $$\Phi_2(x_1, x_2) = \log P(X_1 = x_1) + \log Q(x_1, x_2)$$

and $$\Phi_n(x_{n-1}, x_n; y_n) = \log Q(x_{n-1}, x_n) + \log g(y_n|a(x_n)), n=3, \ldots, N$$

Maximizing Φ(x;y) is then performed using dynamic programming. Once the labels are determined the labels are inserted into the video sequence (Step 1430).

Dynamic programming (or "backwards induction") is known to one of ordinary skill in the art and is used for finding the maximum values of a real-valued function Φ(x). Dynamic programming is computationally feasible, because Φ(x) can be represented as a sum of functions which are each "locally composed" with respect to the structure of the domain of Φ and because, whereas N is very large, |S| is relatively small. The cost of finding the maximizing value can be shown to be on the order of $N \times |S|^2$ and therefore, the cost grows linearly with N. Dynamic programming can be implemented in computer code and executed on a computer or processor.

Dynamic programming takes advantage of the fact that there is no direct "interaction" between any two labels which are not adjacent in the ordering among the fields. In the preferred embodiment in which there are 36 possible states, states x=A,B,C,D all have the same probability and it is assumed that film originating material is more likely than video originating material. The disclosed method for determining the video field labels for an edited video field sequence can be implemented in a computer program or may be implemented in hardware. When presented as a computer program, the method of FIG. 11 is performed for determining the video field labels. The equation for dynamic programming requires only the historic data in the form of the transition matrix Q and the conditional density which is calculated based upon the actual video data to be labeled and the historic video data. In the first step, historic video data is retrieved from memory. In the preferred embodiment, the historic video data would have the form of a transition matrix $Q(x_{i-1}, x_i)$ for all transition pairs of video fields $x_{i-1}$, $x_i$ (step 1500). The historic data is loaded into a computer processor and then the conditional density $g(y_i|a(x_i))$ is calculated for all possible values of a(x) (step 1510). A functional representation of the actual video data is calculated (y_i) and for all possible label sequences, a(x) is determined which is then used to determine which mean and standard deviation for calculating $g(y_i|a(x_i))$. All of the means and standard deviations are precalculated for each $a(x_i)$. It should be understood by those of ordinary skill in the art that step 1500 and step 1510 may be performed in any order or simultaneously by a computer. Once the historic data is loaded form memory and the conditional density is calculated based on the current edited video field sequence, dynamic programming is performed to determine the sequence of labels (step 1520). After the labels have been determined for the video fields, the labels may be inserted into the video field data or attached as a header to each field. In an alternative embodiment, the labels are stored as a list and sent as a separable file from the video field data for further processing, such as, cadence editing.

Figure 12:
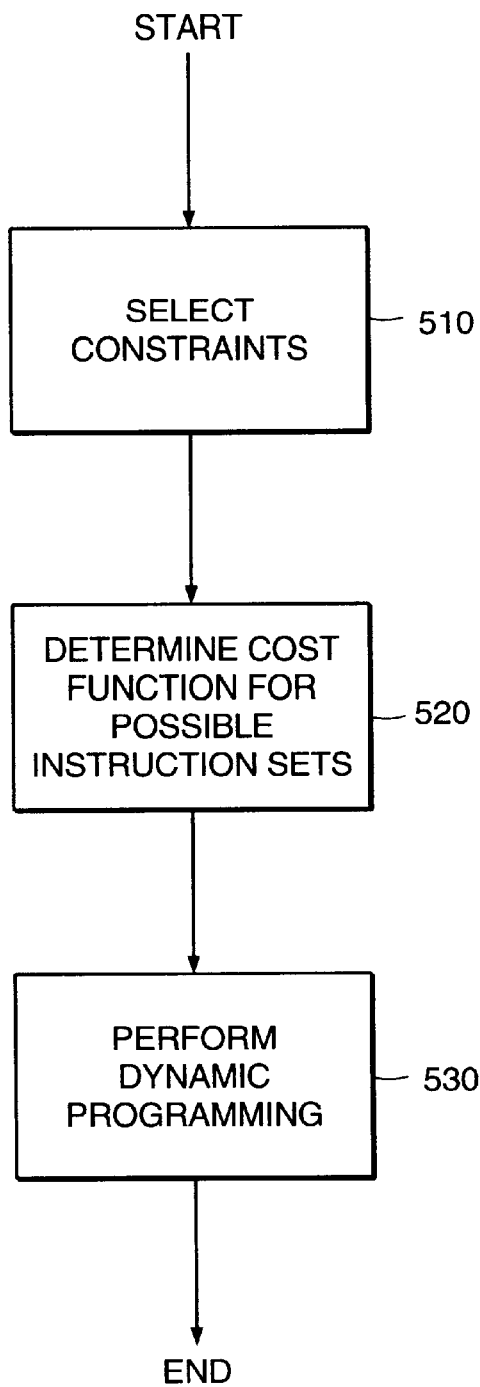
FIG. 12 shows the steps executed in the cadence module of FIG. 3.

FIG. 12 shows the steps executed in the cadence module of FIG. 3. First the constraints are specified (Step 510). Different applications may require different constraints. Specifying the constraints implies that the constraints which will be used to determine the instruction set are selected for the edited video field sequence. In other embodiments, in which the method is incorporated into a system, the system may be designed for a specific application. In such a configuration, the constraints may not be selectable and may be fixed in which case step 510 would be unnecessary. In the preferred embodiment, there are four constraints. The first constraint is that the number of the field chosen from $F^{old}$ for position n should be near n. That is $|z_n - n|$ should be small for each n=1, ..., N. In addition, the new sequence should preserve the flow of time from the edited video sequence such that $z_n \leq z_{n+1}$; otherwise the visual appearance is compromised.

The second constraint is that the correct pattern of repetitions is $$F^{new}_{3+10j} = F^{new}_{5+10j}, F^{new}_{8+10j} = F^{new}_{10+10j}, j = 0, 1, 2, \ldots, \left[\frac{N}{10}\right] - 1$$

Here $$\left[\frac{N}{10}\right]$$

is the greatest integer less than or equal to $$\frac{N}{10}.$$

From the video field label output repeated fields can be identified.
The repetition constraint is then $$X(z_{3+10j}) = X(z_{5+10j}) \text{ and } X(z_{8+10j}) = X(z_{10+10j})$$

with the convention that $B_1 = B_2$ and $d_1 = d_2$. This constraint restricts the sequence such that every third and fifth video fields and every eighth and tenth fields from each set of ten video fields are identical as required by perfect cadence.

The third constraint addresses whether each field in the grouping of ten fields has a corresponding field such that the combination of the two fields accounts for a video frame. In perfect cadence, each of the pairs (1,2),(3,4),(5,4),(7,6),(9,8),(9,10) represents an (odd, even) couple which, in the case of film-originating material, comes from the same film frame and hence correspond to the same instant in time. In the case of video-originating material, successive fields are separated by $$\frac{1}{60}\text{'th}$$

of a second and also alternate between odd and even fields. The third constraint maintains the pattern required by perfect cadence without requiring strict adherence to the specific frame designations. Each of the pairs $(X(z_1),X(z_2))$, $(X(z_3),X(z_4))$, $(X(z_5),X(z_4))$, $(X(z_7),X(z_6))$, $(X(z_9),X(z_8))$, $(X(z_9),X(z_{10}))$ should form an odd/even pair comprising one frame of video and each pair should belong to the set of P where P contains the frames {(A,a), $(B_1,b)$, $(B_2,b)$, (C,c), $(D,d_1)$, $(D,d_2)$,(V,v) along with all other video field pairs that follow the pattern for perfect cadence wherein there is an edit such as (A',a"),$(B_1',b")(B_2',b")$, (C',c"), $(D',d_1")$, $(D',d_2")$,(V',v") etc.} Similarly for $(X(z_{11}),X(z_{12}))$, $(X(z_{13}),X(z_{14}))$, etc. each pair should belong to P. For example, the first frame $(X(z_1), X(z_2))$ need not be (A,a), but could very well be (C,c) which is a member pair of P. Thus, the pattern for perfect cadence is constrained.

The fourth constraint limits the "upconverting" of orphan fields. Orphan fields are only upconverted if there is no better solution to the cost optimization without upconversion. Upconversion will most likely occur at edit points. The video field labels identify the edit points and a simple comparison may be done to determine whether an orphan field exists after the edit point and should be upconverted.

The cost function is then determined for all possible instruction sets based upon the constraints (Step 520). In the preferred embodiment, the cost function has four terms corresponding to the four constraints described in the previous section. In what follows, $\delta(E)$ is the logical expression which takes the value 1 if the condition E is satisfied and takes the value 0 otherwise. The four terms which comprise the cost function, $\Phi$, are:

$$\Phi_1(Z) = \sum_{n=1}^{N}(z_n - n)^2 + \sum_{n=1}^{N}\delta(z_n \leq z_{n+1} + 1) \quad 1.$$

This measures the extent to which the first constraint is satisfied. Thus, $\Phi_1 = 0$ if $F^{new} = F^{old}$. In an instruction set in which upconverted fields are present the value for $\Phi_1$ may be approximately equal to zero. In the preferred embodiment, it is not required that $z_{n+1} = z_n + 1$ in order to allow some flexibility in order to recover the cadence.

$$\Phi_2(Z) = \sum_{j=0}^{\left[\frac{N}{10}\right]} \delta(X(z_{3+10j}) \neq X(z_{5+10j})) + \delta(X(z_{8+10j}) \neq X(z_{10+10j})) \quad 2.$$

The second element of the cost function penalizes the instruction set if $F^{new}$ does not have repeated fields at the expected locations in an ideal digital video sequence having perfect cadence. This element of the cost function quantifies the degree of adherence to the correct pattern of repetitions.

$$\Phi_3(Z) = \sum_{j=0}^{\left[\frac{N}{10}\right]} \delta[(X(z_{1+10j}), X(z_{2+10j})) \in P] + \quad 3.$$

$$\delta[(X(z_{3+10j}), X(z_{4+10j})) \in P] +$$

$$\delta[(X(z_{5+10j}), X(z_{4+10j})) \in P] +$$

$$\delta[(X(z_{7+10j}), X(z_{6+10j})) \in P] +$$

$$\delta[(X(z_{9+10j}), X(z_{8+10j})) \in P] +$$

$$\delta[(X(z_{9+10j}), X(z_{10+10j})) \in P]$$

This third term to the cost function charges a unit penalty every time a frame is not properly constituted.

$$\Phi_4(Z) = \sum_{n=1}^{N} u_n [2 - \delta(X(z_n) \in S)] \qquad 4.$$

where S denotes the set of locations which immediately follow a scene change for example a',V',c'D' etc. The effect of $\Phi_4$ is to charge a unit penalty for each upconversion, regardless of its location, as well as an additional penalty if the location does not follow a scene change.

The final cost function is $$\Phi(Z) = \sum_{k=1}^{4} \lambda_k \Phi_k(Z)$$

Where $\lambda_1 \ldots \lambda_4$ are positive constants which can be adjusted to normalize the constraints or to emphasize certain constraints relative to others. $\Phi$ can be rewritten in the following form:

$$\Phi(Z) = \sum_{n=1}^{N-2} \Psi_n(z_n, z_{n+1}, z_{n+2})$$

This follows since each of the functions $\Phi_i$, is at most dependent on the two subsequent values of the instruction set. For example, $\Psi_1$ and $\Psi_3$ are shown to be, $$\Psi_1(z_1, z_2, z_3) = \lambda_1 [(z_1 - 1)^2 + \delta(z_1 \le z_2 + 1)] +$$
$$\lambda_3 \delta [(X(z_1), X(z_2)) \in P] +$$
$$\lambda_4 u_1 [2 - \delta(X(z_1) \in S)]$$

and $$\Psi_3(z_3, z_4, z_5) = \lambda_1 [(z_3 - 3)^2 + \delta(z_3 \le z_4 + 1)] +$$
$$\lambda_2 \delta [X(z_3) \ne X(z_5)] +$$
$$\lambda_3 \delta [(X(z_3), X(z_4)) \in P] +$$
$$\lambda_4 u_3 [2 - \delta(X(z_3) \in S)]$$

The representation of $\Phi(Z)$ does not have a unique solution so that there are many ways to choose the functions $\Psi_n$.

Minimization of $\Phi(Z)$ is found using dynamic programming in similar fashion to the dynamic programming used to find the video field labels (Step 530). The cost function is evaluated and stored for three instructions at a time, wherein the video field labels are used to evaluate the constraints of the cost function. Dynamic programming is known to those of ordinary skill in the art for functions having the form which is the exact form of the equation for $\Phi(Z)$. This technique takes advantage of the fact that there is no direct "interaction" between any two variables which are not within two places within the ordering among the variables. Thus, at each iteration for n in the process of dynamic programming, a minimization over one variable is performed for each pair of states.

Dynamic programming may be implemented in a computer program for use on a computer system and is known to those of ordinary skill in the art. It should be understood by those of ordinary skill in the art that instruction sets other than the optimal solution may be chosen and used to create a new video field sequence with approximately perfect cadence.

Figure 13:
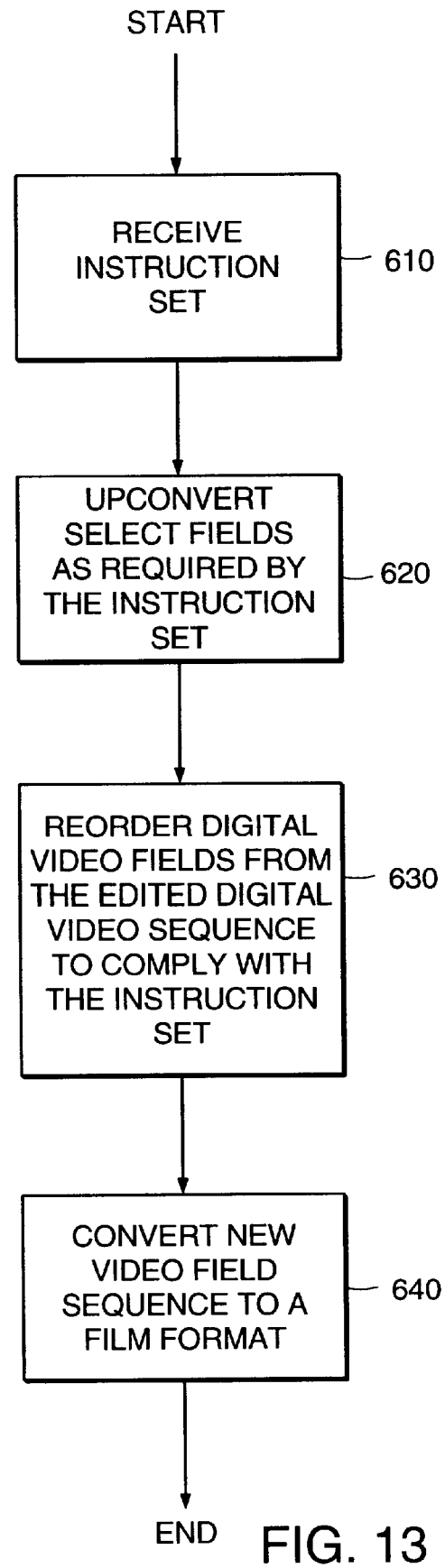
FIG. 13 shows the steps executed in the reformation module of FIG. 3.

When the dynamic programming step is completed the optimal result is the most likely instruction set for obtaining near perfect cadence. FIG. 13 shows the steps which occur in the reformation module of FIG. 3. First the instruction set is received into the reformation module along with the edited video sequence (Step 610). The reformation module determines if any of the orphan fields from the edited video sequence need to be upconverted for use in the new video field sequence (Step 620). In one embodiment, the instruction set Z, is constructed of instruction of the form $(z_1, z_2, z_3, u, z_5, \ldots$ etc.), where the symbol 'u' indicates that a field is to be upconverted. If an orphan field needs to be upconverted it may be achieved through standard techniques known in the art.

Creating a mate for an orphaned field $F_n$ is an approximation as the actual data is missing due to editing. Two methods known in the art for upconversion are interpolation and smoothing. For example, if $F_n$ is an even field, an odd companion must be created, e.g., rows k=1,3,5, . . . etc. need to be constructed. In interpolation, the new intensity value at column j(i.e., the j'th pixel in row k) is the average of the j'th pixel of $F_n$ in row k−1 and the j'th pixel in row k+1. In smoothing, a continuous curve (e.g., a polynomial) is applied to the $F_n$ data in column j and then the curve is sampled at spacings corresponding to a full set of lines; in particular, two new fields are created rather than only one.

Once the orphan fields are upconverted the video fields are reordered according to the instruction set (Step 630). Instruction $Z_n$ for field n indicates which field is to be used in position n from the original edited video field sequence in the new video field sequence. The new video field sequence exhibits substantially perfect cadence, such that the sequence is approximately of the form of a film formatted sequence after 3:2 pulldown. Every ten fields in the new sequence should exhibit the same pattern. The first field should be an odd field and the second an even field where the first and second fields are from the same frame of film or video. Field three should be odd and field four should be even and from the same frame. Field five should be a repeated field and identical to field three. Field six should be an even field and field seven should be an odd field and both fields six and seven should originate from the same film or video frame. Field eight should be an even field and field nine should be odd and these fields should correspond to the same frame of film or video. Field ten should be identical to field eight and should be an even field. It should be understood by those of ordinary skill in the art that the very first field of the new video sequence may not correspond to an odd A field in the pattern $AaB_1bB_2cCd_1Dd_2$ since the edited sequence may begin at any point within the sequence of ten fields $(AaB_1bB_2cCd_1Dd_2)$, for example, the first field of the new video sequence might be C which is an odd field. However, if the first field of the new video field sequence is C from the edited video field sequence, the second field should be c, an even field. The desired result of the method is that the video sequence maintains the patterns found within the perfect cadence sequence of ten fields.

After the new video field sequence is properly ordered, the sequence is transferred into a film format through a reverse 3:2 pulldown (Step 640). The reverse 3:2 pull down consists of eliminating the fifth and tenth field of each sequence of ten fields and reorder the sixth and seven field and the eighth and ninth fields so that the pattern is AaB-bCcDd or four consecutive frames of film. In alternative embodiments each of the odd and even fields may be recombined into a single frame of digital film so that the pattern is ABCD where each bold letter is a complete frame of video.

It should be understood that dynamic programming may be used over parts of the edited video field sequence, such as, for example, fields 1–100,101–200, and 200–N forming, in this example three segments. The method may be used on each of the segments to determine the instruction set for providing near perfect cadence. The segments may be reordered each according to the specific instruction set associated with the segment. The segments may then be recombined to form an unoptimized, but complete, edited video sequence which has near perfect cadence with the exception of the fields near the transition points. Such a methodology would allow for parallel processing, thereby increasing the speed for constructing the new video sequence at the expense of an optimal solution.

Figure 14:
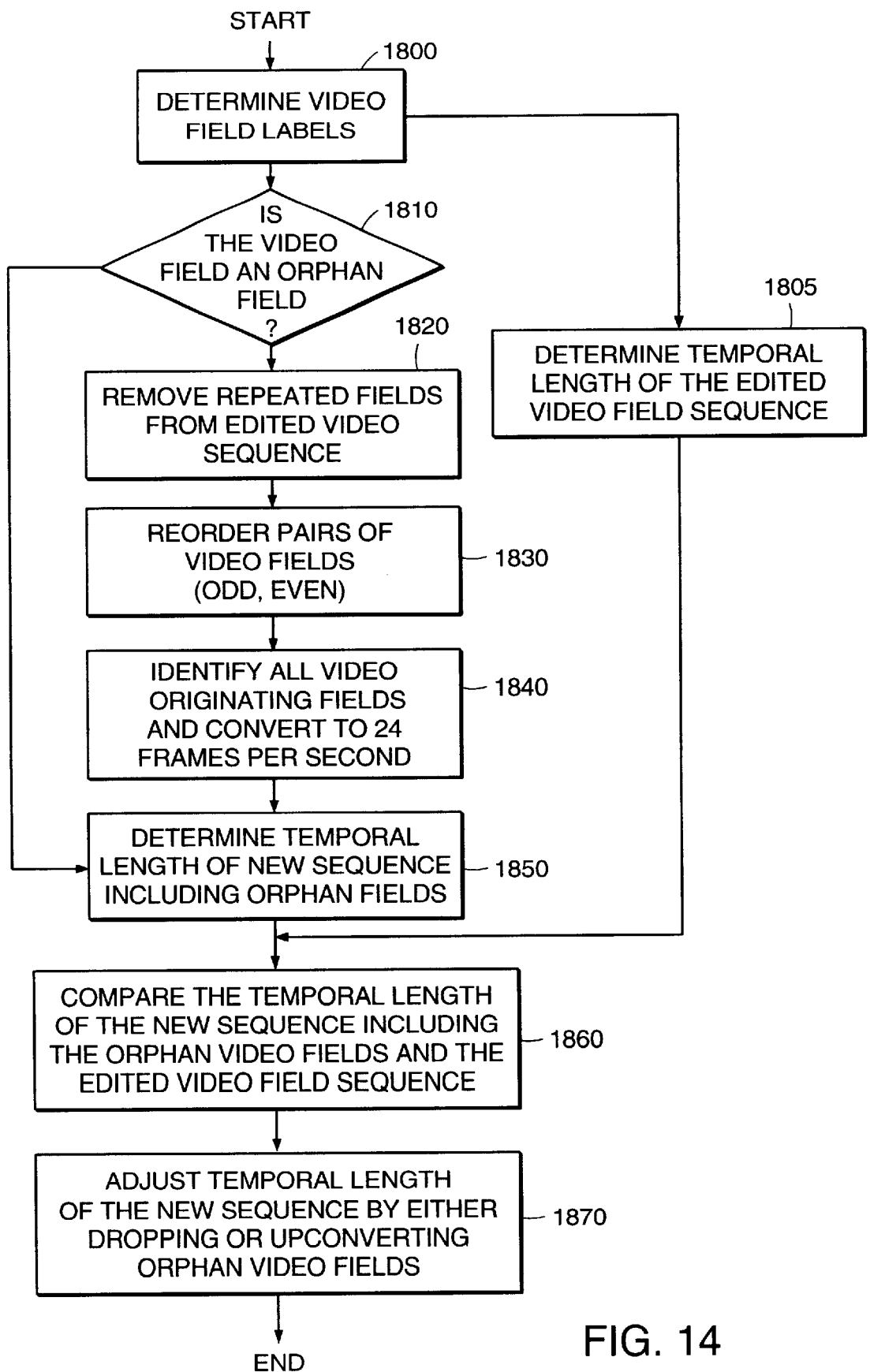
FIG. 14 shows an alternative method for performing cadence editing.

In an alternative embodiment, cadence may be restored to an edited video sequence according to the steps in FIG. 14. In step 1800 video field labels are determined for the edited video field sequence according to the method described above with respect to FIGS. 5–11. The temporal length of the edited video field sequence is calculated (step 1805). Once the video fields are labeled, all orphan video fields are identified and marked (step 1810). The orphan fields may be removed from the edited video field sequence and stored in memory or marked and skipped in the following steps.

Next repeated video fields are removed from the edited video field sequence (step 1820). The procedures progressively looks at three fields at a time and identifies if there is a repeated field amongst the three fields. The procedure looks for sequences of the form $(B_1,b,B_2)$, $(B_1b",B_2),(d_1, D",d_2)$, or $(d_1',D",d_2)$ and then eliminates the second repeated field. This may be accomplished simply by identify the labels or by performing a comparison on the video fields.

In the next step, the labels from each pair of video fields are identified and placed into a film format such that each pair of video fields should be in odd, even pairing (step 1830). Rules can be designated, such as, if $(X_n,N_{n+1})=(c,C)$ then the data is reversed such that the labels should now be (C,c). Another, rule would be $(X_n,N_{n+1})=(b',B_2")$ the data would be reversed such that the labels would be $(B_2", b')$. Additionally, other rules for all possible cases can similarly be defined. The number of rules is finite and relatively small because the Q matrix of the structure model which represents all possible one step transitions is composed of many zeros, where a zero in the matrix designates an impossible transition. For instance, the transition (C,c) would have zero mass in the Q matrix as this transition is impossible after 3:2 pulldown and therefore does not require a rule.

In the next step all video originating fields are identified (step 1840). The fields are then converted to a film format (24 frames per second). This may be accomplished using motion-compensated standards conversion. Alternatively, the video originating video fields may be decimated from 60 fields per second to 24 fields per second and then the fields are each upconverted resulting in video originating material at 24 frames per second. The upconversion may be performed using the method taught in U.S. Provisional Application Serial No. 60/192,926 entitled Format Conversion filed on Mar. 29, 2000 which is incorporated by reference herein in its entirety.

The temporal length of the new sequence including the orphan fields is calculated (step 1850). Next the temporal length of the new sequence and the temporal length of the edited video field sequence are compared (step 1860). The orphan fields are then either upconverted or dropped in order to minimize the discrepancy between the temporal length of the sequences (step 1870). The new video field sequence is then in a film format. This film format could be converted to a video format having perfect cadence by performing a 3:2 pulldown.

In an alternative embodiment, the disclosed method for cadence editing may be implemented as a computer program product for use with a computer system. Such implementation may include a series of computer instructions fixed either on a tangible medium, such as a computer readable medium (e.g., a diskette, CD-ROM, ROM, or fixed disk or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Preferred embodiments of the present invention have been described. While the invention is described in detail herein, it is to be clearly understood that the same is by way of illustration and example and is not to be taken by way of limitation. Indeed, numerous variations and modifications will be apparent to those skilled in the art. All such variations and modifications are intended to be within the scope of the present invention as defined in the appended claims.

We claim:

1. A method for converting an edited digital video field sequence having digital video fields to a new digital video field sequence having near perfect cadence, the method comprising:

determining an instruction set for at least reordering the video fields in an order exhibiting near perfect cadence for the entire edited digital video field sequence by performing global optimization such that the instruction set is selected from substantially all possible instruction sets; and applying the instruction set to the edited digital video field sequence to form the new digital video field sequence.

2. The method according to claim 1, further comprising:

converting the new digital video field sequence into a digital film format.

3. A method for converting an edited digital video field sequence having digital video fields to a new digital video field sequence having near perfect cadence, the method comprising:

determining an instruction set for at least reordering the video fields in an order exhibiting near perfect cadence for the entire edited digital video field sequence by performing global optimization such that the instruction set is selected from substantially all possible instruction sets by minimizing a cost function for substantially all possible instruction sets wherein cost increases for each violation of a constraint; and applying the instruction set to the edited digital video field sequence to form the new digital video field sequence.

4. The method according to claim 3, wherein the act of minimizing evaluates whether an upconversion of at least one field from the edited video field sequence will minimize the cost function.

5. The method according to claim 3, wherein one constraint restricts the new video field sequence to having a perfect cadence pattern.

6. The method according to claim 5, wherein having a perfect cadence pattern indicates that there is a pattern of repetition having a length of ten fields.

7. The method according to claim 6, wherein the pattern is of the form $AaB_1bB_2cCd_1Dd_2$.

8. The method according to claim 7, wherein the first field in the new video field sequence may be any of the ten fields in the pattern.

9. The method according to claim 3, wherein one constraint is that each field within the new video field sequence should follow the pattern defining perfect cadence.

10. The method according to claim 3, wherein one constraint is that a field should not be upconverted unless the cost function cannot be minimized in any other way.

11. The method according to claim 3, wherein one constraint is that position of a video field in the new video field sequence should be substantially the same as the video field's position in the edited video field sequence.

12. The method according to claim 3 wherein the step of minimizing a cost function is done for all possible instruction sets such that the instruction set used for reordering the video fields has been globally optimized.

13. The method according to claim 1, wherein the minimized cost function determines the instruction set with near perfect cadence.

14. The method according to claim 13, wherein the instruction set represented by the minimized cost function is used for forming the new digital video field sequence.

15. The method according to claim 13, wherein an instruction set other than that represented by the minimized cost function is used for forming the new digital video field sequence.

16. The method according to claim 13, wherein the act of minimizing is performed through dynamic programming.

17. The method according to claim 1, wherein the act of determining further comprises:

determining labels for the video fields having indicia as to origin of source and proximity to edit points.

18. The method according to claim 17, wherein the labels further indicate if the source is determined to be film originating.

19. The method according to claim 17, wherein determining labels for the video fields is accomplished using the Markov graphical model.

20. The method according to claim 18, wherein the video field labels are used to evaluate the constraints.

21. The method according to claim 1, wherein in the act of applying the instruction set, if the instruction set indicates that an upconversion of a video field is necessary then upconverting the video field.

22. A method for converting an edited digital video field sequence having digital video fields to a new digital video field sequence having near perfect cadence, the method comprising:

determining an instruction set from substantially all possible instruction sets for at least reordering the video fields in an order exhibiting near perfect cadence for the entire edited digital video field sequence by minimizing a cost function for substantially all possible instruction sets wherein cost increases for violations of a constraint; and applying the instruction set to the edited digital video field sequence to form the new digital video field sequence;

wherein one constraint is that repeated fields appear at the fifth and tenth fields for each successive ten fields present in the new digital video sequence.

23. A method for transferring data from an edited digital video format to a digital film format, wherein the edited digital video format is composed of a sequence of video fields, the method comprising:

determining labels for the video fields using global optimization analyzing substantially all possible sequences of labels each label having indicia as to origin, indicia as to position relative to an edit point in the sequence and indicia as to whether the video field is repeated; and restructuring the sequence based upon the video field labels so that the sequence of video fields corresponds to a near digital film format.

24. A method according to claim 23, wherein the act of restructuring includes:

reordering the digital video format so that it is in 3:2 pulldown format; and eliminating repeated fields.

25. A method according to claim 23, wherein the act of restructuring further includes upconverting orphan fields.

26. A method according to claim 23, wherein the act of restructuring produces a digital film format of equal temporal length to the edited digital video format.

27. A method according to claim 23, wherein the act of restructuring includes using the video field labels to determine an overall cost for a violation of a predefined constraint; and optimizing the order of the sequence of video fields based upon the cost.

28. A computer program product for use on a computer system for transferring data from an edited digital video format to a digital film format, wherein the edited digital video format is composed of a sequence of video fields, the computer program product comprising a computer usable medium having computer readable program code thereon, the computer readable program code including:

computer code for determining labels for the video fields using global optimization analyzing substantially all possible sequences of labels, each label having indicia as to origin, indicia as to position relative to an edit point in the sequence and indicia as to whether the video field is repeated; and computer code for restructuring the sequence based upon the video field labels so that the sequence of video fields corresponds to a digital film format.

29. A computer program product according to claim 28, wherein the computer code for restructuring further comprises:

computer code for reordering the digital video format so that it is in 3:2 pulldown format; and computer code for eliminating repeated fields.

30. A computer program product according to claim 28, wherein in the computer code for restructuring further comprises:

upconverting orphan fields.

31. A computer program product according to claim 28, wherein the computer code for restructuring produces a digital film format of equal temporal length to the edited digital video format.

32. A computer program product according to claim 28, wherein the computer code for restructuring requires using the video field labels to determine an overall cost for a violation of a predefined constraint; and computer code for optimizing the order of the sequence of video fields based upon the cost.

33. An apparatus for converting an edited digital video field sequence into a new video field sequence exhibiting near perfect cadence, the apparatus comprising:

a cadence module for determining an instruction set from substantially all possible instruction sets for at least reordering the edited video digital field sequence; and a reformatting module for reformatting the edited digital video field sequence according to the instruction set from the cadence module so that the new video field sequence exhibits near perfect cadence.

34. An apparatus according to claim 33, further comprising:

an editor for receiving into an input data in a digital format from a plurality of different originating formats and outputting an edited digital video field sequence to the cadence module.

35. A method for converting an edited digital video field sequence to a film format video field sequence having a film format, the method comprising:

determining video field labels using global optimization analyzing substantially all possible sequences of labels for the edited video field sequence; and converting the edited video field sequence to a film format based on the video field labels.

36. The method according to claim 35, wherein converting further comprises:

determining if a video field is an orphan field.

37. The method according to claim 36, wherein converting further comprises:

removing repeated fields from the edited video field sequence.

38. The method according to claim 37, wherein converting further comprises:

reordering video field pairs so that each pair is an odd/even pair forming a new video field sequence.

39. The method according to claim 38, wherein converting further comprises:

identifying all video originating fields; and performing a motion-compensated standards conversion on the video originating fields; and adding the motion compensated video originating fields to the new video field sequence.

40. The method according to claim 39, wherein converting further comprises:

determining temporal length of the edited video field sequence;

determining temporal length of the new video field sequence including orphan fields;

comparing the temporal length of the edited video field sequence to the new video field sequence; and adjusting the temporal length of the new sequence to the temporal video field sequence.

41. The method according to claim 40, wherein adjusting occurs through upconverting orphan fields if the temporal length of the new video field sequence is less than the temporal length of the edited video field sequence.

42. The method according to claim 41 wherein adjusting occurs through dropping orphan fields if the temporal length of the new video field sequence is greater than the temporal length of the edited video field sequence.

43. A computer program product for use on a computer system for transferring data from an edited digital video format to a digital film format, wherein the edited digital video format is composed of a sequence of video fields, the computer program product comprising a computer usable medium having computer readable program code thereon, the computer readable program code includes:

computer code for determining an instruction set using global optimization such that the instruction set is selected from substantially all possible instruction sets, the instruction set for at least reordering the video fields in an order exhibiting near perfect cadence for the entire edited digital video field sequence;

computer code for applying the instruction set to the edited digital video field sequence to form the new digital video field sequence.

44. The computer program product according to claim 43, further comprising:

computer code for converting the new digital video field sequence into a digital film format.

45. A computer program product for use on a computer system for transferring data from an edited digital video format to a digital film format, wherein the edited digital video format is composed of a sequence of video fields, the computer program product comprising a computer usable medium having computer readable program code thereon, the computer readable program code includes:

computer code for determining an instruction set for at least reordering the video fields in an order exhibiting near perfect cadence for the entire edited digital video field sequence;

computer code for applying the instruction set to the edited digital video field sequence to form the new digital video field sequence; and computer code for minimizing a cost function over substantially all possible instruction sets wherein cost increases for violation of a constraint.

46. The computer program product according to claim 45, wherein the computer code for determining further comprises:

computer code for determining labels for the video fields having indicia as to origin of source and proximity to edit points.

47. The computer program product according to claim 46, wherein the labels further indicate if the source is determined to be film originating, position of the video field in the perfect cadence sequence.

48. The computer program product according to claim 47, wherein the video field labels are used to evaluate the constraints.

49. The computer program product according to claim 45, wherein the computer code for minimizing evaluates whether an upconversion of at least one field from the edited video field sequence will minimize the cost function.

50. The computer program product according to claim 45, wherein one constraint restricts the new video field sequence to having a perfect cadence pattern.

51. The computer program product according to claim 50, wherein having a perfect cadence pattern indicates that there is a pattern of repetition having a length often fields.

52. The computer program product according to claim 51, wherein the pattern is of the form $AaB_1bB_2cCd_1Dd_2$.

53. The computer program product according to claim 52, wherein the first field in the new video field sequence may be any of the ten fields in the pattern.

54. The computer program product according to claim 45, wherein one constraint is that each field within the new video field sequence should follow the pattern defining perfect cadence.

55. The computer program product according to claim 45, wherein one constraint is that a field should not be upconverted unless the cost function cannot be minimized in any other way.

56. The computer program product according to claim 45, wherein one constraint is that position of a video field in the new video field sequence should be substantially the same as the video field's position in the edited video field sequence.

57. The computer program product according to claim 43, wherein computer code for minimizing the cost function determines the instruction set with near perfect cadence.

58. The computer program product according to claim 57, wherein the instruction set represented by the minimized cost function is used for forming the new digital video field sequence.

59. The computer program product according to claim 57, wherein an instruction set other than that represented by the minimized cost function is used for forming the new digital video field sequence.

60. The computer program product according to claim 57, wherein the computer code for minimizing is performed through dynamic programming.

61. The computer program product according to claim 43, wherein in the computer code for applying the instruction set, if the instruction set indicates that an upconversion of a video field is necessary then upconverting the video field.

62. A computer program product for use on a computer system for transferring data from an edited digital video format to a digital film format, wherein the edited digital video format is composed of a sequence of video fields, the computer program product comprising a computer usable medium having computer readable program code thereon, the computer readable program code includes:

computer code for determining an instruction set for at least reordering the video fields in an order exhibiting near perfect cadence for the entire edited digital video field sequence using global optimization where the instruction set is selected from substantially all possible instruction sets;

computer code for applying the instruction set to the edited digital video field sequence to form the new digital video field sequence; and computer code for minimizing a cost function for possible instruction sets wherein cost increases for violations of a constraint; wherein one constraint is that repeated fields appear at the fifth and tenth fields for each successive ten fields present in the new digital video sequence.

63. A computer program product for use in conjunction with a computer for transferring data from an edited digital video format to a digital film format, wherein the edited digital video format is composed of a sequence of video fields, the computer program product having computer readable code thereon, the computer readable code comprising:

computer code for determining labels for the video fields using global optimization analyzing substantially all possible sequences of labels, the labels having indicia as to origin, indicia as to position relative to an edit point in the sequence and indicia as to whether the video field is repeated; and computer code for restructuring the sequence based upon the video field labels so that the sequence of video fields corresponds to a near digital film format.

64. A computer program product according to claim 56, wherein the computer code for restructuring includes:

computer code for reordering the digital video format so that it is in 3:2 pulldown format; and computer code for eliminating repeated fields.

65. A computer program product according to claim 56, wherein the computer code for restructuring further includes computer code for upconverting orphan fields.

66. A computer program product according to claim 56, wherein the computer code for restructuring produces a digital film format of equal temporal length to the edited digital video format.

67. A computer program product according to claim 56, wherein the computer code for restructuring requires using the video field labels to determine an overall cost for a violation of a predefined constraint; and computer code for optimizing the order of the sequence of video fields based upon the cost.

68. A method for converting an edited digital video field sequence having digital video fields to a new digital video field sequence having near perfect cadence, the method comprising:

determining an instruction set for at least reordering the video fields in an order exhibiting near perfect cadence for the entire edited digital video field sequence; and applying the instruction set to the edited digital video field sequence to form the new digital video field sequence;

wherein the instuction set is determined through global optimization of all possible instruction sets.

69. The method according to claim 68, wherein the instruction set is optimized such that the new digital video field sequence has substantially the same temporal length as the edited digital video field sequence.

70. A method for transferring data from an edited digital video format to a digital film format, wherein the edited digital video format is composed of a sequence of video fields, the method comprising:

determining labels for video fields with indicia as to origin, indicia as to position relative to an edit point in the sequence and indicia as to whether the video field is repeated; and restructuring the sequence based upon the video field labels so that the sequence of video fields corresponds to a near digital film format, wherein the sequence is globaly optimized based upon minimizing a cost function over all possible sequences.

71. The method according to claim 70 further comprises using all field labels from the sequence of video fields to determine the position of each video field in the sequence.

* * * * *

UNITED STATES PATENT AND TRADEMARK OFFICE
CERTIFICATE OF CORRECTION

PATENT NO.     : 6,542,199 B1
DATED          : April 1, 2003
INVENTOR(S)    : Kevin Manbeck et al.

It is certified that error appears in the above-identified patent and that said Letters Patent is hereby corrected as shown below:

<u>Column 22,</u>
Line 65, replace "often" with -- of ten --.

Signed and Sealed this

Fourth Day of November, 2003

JAMES E. ROGAN
*Director of the United States Patent and Trademark Office*